United States Patent
Asai et al.

(10) Patent No.: US 7,259,495 B2
(45) Date of Patent: Aug. 21, 2007

(54) CONDUCTIVE POLYMER ACTUATOR

(75) Inventors: Katsuhiko Asai, Nara (JP); Kazuo Yokoyama, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 135 days.

(21) Appl. No.: 11/271,971

(22) Filed: Nov. 14, 2005

(65) Prior Publication Data

US 2006/0219983 A1 Oct. 5, 2006

Related U.S. Application Data

(63) Continuation of application No. PCT/JP2005/008341, filed on May 6, 2005.

(30) Foreign Application Priority Data

May 24, 2004 (JP) ............................ 2004-153234

(51) Int. Cl.
*H01L 41/08* (2006.01)
(52) U.S. Cl. ...................................... 310/311; 310/800
(58) Field of Classification Search ................ 310/311, 310/800
See application file for complete search history.

(56) References Cited

U.S. PATENT DOCUMENTS 5,724,187 A * 3/1998 Varaprasad et al. ......... 359/608
5,977,685 A * 11/1999 Kurita et al. ................ 310/311
6,835,173 B2 * 12/2004 Couvillon, Jr. .............. 600/146
7,202,987 B2 * 4/2007 Varaprasad et al. ......... 359/265

FOREIGN PATENT DOCUMENTS

| JP | 9-79129 | 3/1997 |
| JP | 11-169393 | 6/1999 |
| JP | 2000-83389 | 3/2000 |
| JP | 2000-133854 | 5/2000 |

OTHER PUBLICATIONS

Gordon G. Wallace, et al., "Factors Influencing Performance of Electrochemical Actuators Based on Inherently Conducting Polymers (ICPs)", Smart Structures and Materials 2002: Electroactive Polymer Actuators and Devices (EAPAD), Yoseph Bar-Cohen, Editor, Proceedings of SPIE, vol. 4695 (2002), pp. 8-16.
Wataru Takashima, et al., "Cyclic Step-Voltammetric Analysis of Cation-Driven and Anion-Driven Actuation in Polypyrrole Films", The Japan Society of Applied Physics vol. 41 (2002), pp. 7532-7536, Part 1, No. 12, Dec. 2002.

* cited by examiner

Primary Examiner—Mark Budd
(74) Attorney, Agent, or Firm—Wenderoth, Lind & Ponack, L.L.P.

(57) ABSTRACT

Two conductive polymer films, one of which swells and the other of which shrinks by an oxidation-reduction reaction, are connected to a link mechanism for reciprocally converting shrinkage-directional displacements of one film to swell-directional displacements of the other film, so that driving force in the expansion direction of one conductive polymer film can be generated by driving force in contraction direction of the other conductive polymer film.

12 Claims, 12 Drawing Sheets

CONDUCTIVE POLYMER ACTUATOR

This a continuation application of International Application No. PCT/JP2005/008341, filed May 6, 2005.

BACKGROUND OF THE INVENTION

The present invention relates to a conductive polymer actuator having rigidity in contraction direction and driving force in expansion direction and to a robot using the same.

With increased demands for machines operating in places near human beings such as household robots, expectation for artificial muscle actuators with smooth operation like human muscles are growing. Various types of actuator have been proposed as candidates of the artificial muscle actuator, and among these is an actuator using conductive polymer.

As one example of the artificial muscle actuators using conductive polymer, an actuator for generating bending deformation as shown in FIG. 11A, FIG. 11B, and FIG. 11C has been proposed. The actuator is structured to hold a solid electrolyte compact 22 between polyaniline film members 21a and 21b which are conductive polymer films. When a switch 98 is turned on, potential difference set in a power source 97 is applied to between the polyaniline film members 21a and 21b, so that as shown in FIG. 11B, anions are inserted into one polyaniline film member 21b to expand the polyaniline film member 21b, while anions withdraw from the other polyaniline film member 21a to compress the polyaniline film member 21a, resulting in generation of the bending deformation (see, e.g., Patent Document 1: Japanese Unexamined Patent Publication No. H11-169393).

While in this structure, the bending deformation is generated by difference in displacement magnitude between two conductive polymer films acting as electrodes, in another structure, there is known an actuator in which an electrolyte holding layer is made from liquid or gel materials so as to prevent deformation of both electrodes from influencing each other, and displacements of only one conductive polymer are extracted for expansion and contraction deformation. In this case, the electrode which does not utilize displacements does not need to be a conductive polymer and therefore a metal electrode is mainly used, and further it is indicated that providing conductive polymer on the metal electrode increases displacements (see Non-Patent Document 1: Proceedings of SPIE, Vol. 4695, pages 8 to 16).

Since this kind of conductive polymer actuator generates a strain equal to that of muscles at a low voltage of 2 to 3 V, its practical application as an artificial muscle is expected.

However, in the case of using conductive polymer as an actuator for performing expansion and contraction deformation, it is impossible for the conductive polymer as it is to have driving force in its expansion direction or rigidity in its contraction direction because the conductive polymer is in a film state. To solve this issue, a method for generating driving force and rigidity to both the directions by applying preloads by springs to an expansion direction of a conductive polymer film is shown in Non-Patent Document 1 (Proceedings of SPIE, Vol. 4695, pages 8 to 16). Moreover, a method for obtaining the same effects by applying preloads by weights is shown in Non-Patent Document 2 (Japanese Journal of Applied Physics, Vol. 41, Part 1, No. 12, Page 7532 to 7536).

However, the actuators having the above structures for performing expansion and contraction deformation still have issues. In the structure involving application of preloads by springs, a spring having high rigidity is necessary for obtaining sufficient rigidity and driving force and in this case, displacements in its shrinkage direction are reduced.

In the structure involving application of preloads by weights, there are such issues that there is an influence in gravity direction, and also a mass of a weight affects dynamic characteristics.

An object of the present invention, in consideration of these issues, is to provide a conductive polymer actuator and a robot using the same capable of acquiring driving force in its expansion direction and rigidity in its contraction direction without the necessity of preloads.

SUMMARY OF THE INVENTION

In order to accomplish the object, the present invention is constituted as shown below.

According to a first aspect of the present invention, there is provided a conductive polymer actuator, comprising:

a first conductive polymer film and a second conductive polymer film connected via an electrolyte holding layer;

a first displacement extraction member connected to the first conductive polymer film; and a second displacement extraction member connected to the second conductive polymer film, wherein the first displacement extraction member and the second displacement extraction member are arranged to have a different displacement direction, and the first and second displacement extraction members are connected in such a way that a swell-directional displacement of one member is reciprocally converted to a shrinkage-directional displacement of the other member to give a potential difference to between the first conductive polymer film and the second conductive polymer film, so that one of the first conductive polymer film and the second conductive polymer film swells while the other shrinks by an oxidation-reduction reaction.

Therefore, according to the present invention, it becomes possible to provide the conductive polymer actuator having driving force in its expansion direction and rigidity in contraction direction without the necessity of preloads. More particularly, according to the present invention, the two conductive polymer films, one of which swells while the other of which shrinks by an oxidation-reduction reaction, are connected in the link mechanism in which a shrinkage-directional displacement of one film is reciprocally converted to a swell-directional displacement of the other film, by which the driving force in its expansion direction of one conductive polymer film can be generated by the driving force in its contraction direction of the other conductive polymer film. Further, when external force is applied to the contraction direction of one conductive polymer film, the external force can be received by the rigidity in the expansion direction of the other conductive polymer film, thereby making it possible to provide the actuator having driving force in the expansion direction and rigidity in the contraction direction without application of preloads.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
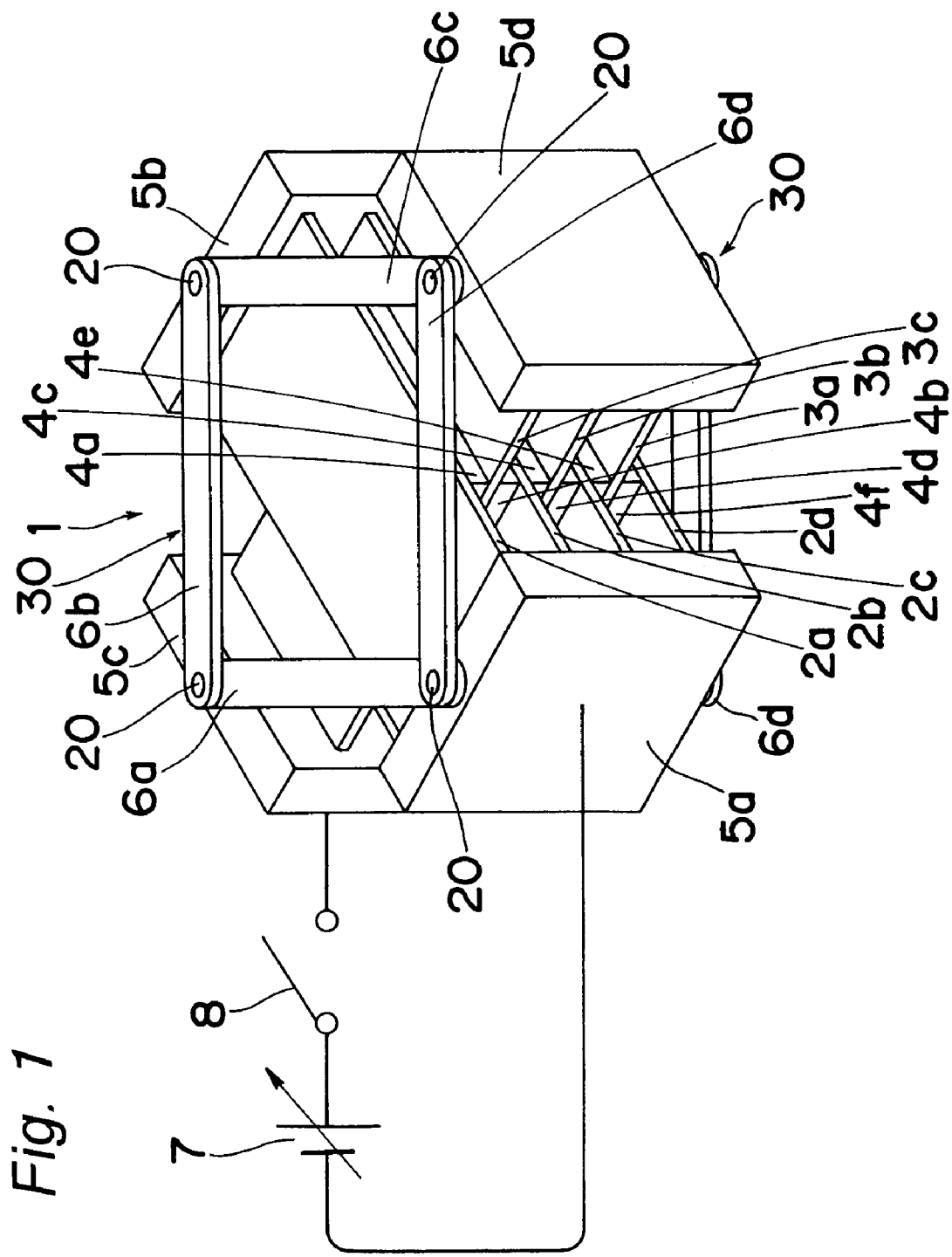
FIG. 1 is a perspective view for showing the outline of an artificial muscle actuator according to a first embodiment of the present invention.

Before the description of the present invention proceeds, it is to be noted that like parts are designated by like reference numerals throughout the accompanying drawings.

Before detailed description is given of the embodiments of the present invention with reference to the drawings, various aspects of the present invention are described hereinbelow.

According to a first aspect of the present invention, there is provided a conductive polymer actuator, comprising:

a first conductive polymer film and a second conductive polymer film connected via an electrolyte holding layer;

a first displacement extraction member connected to the first conductive polymer film; and a second displacement extraction member connected to the second conductive polymer film, wherein the first displacement extraction member and the second displacement extraction member are arranged to have a different displacement direction, and the first and second displacement extraction members are connected in such a way that a swell-directional displacement of one member is reciprocally converted to a shrinkage-directional displacement of the other member to give a potential difference to between the first conductive polymer film and the second conductive polymer film, so that one of the first conductive polymer film and the second conductive polymer film swells while the other shrinks by an oxidation-reduction reaction.

According to such structure, the driving force in the expansion direction of one conductive polymer film can be generated by the driving force in the contraction direction of the other conductive polymer film. Further, when external force is applied to the contraction direction of the one conductive polymer film, the external force can be received by the rigidity in the expansion direction of the other conductive polymer film, thereby making it possible to provide the conductive polymer actuator having driving force in the expansion direction and rigidity in the contraction direction without application of preloads.

According to a second aspect of the present invention, there is provided the conductive polymer actuator as defined in the first aspect, wherein the connection between the first and second displacement extraction members is a connection via a link mechanism.

According to such structure, reciprocal conversion of displacements between the displacement extraction joint members can be easily achieved by the link mechanism, thereby making it possible to provide the conductive polymer actuator having driving force in the expansion direction and rigidity in the contraction direction without application of preloads.

According to a third aspect of the present invention, there is provided the conductive polymer actuator as defined in the first aspect, wherein the connection between the first and second displacement extraction members is a mutual connection at locations with an angle different from an angle of respective displacement directions.

According to such structure, with surface-directional relative movement of the members forming different angles with displacement directions in two adjacent displacement extraction members, reciprocal conversion of displacements between the displacement extraction members is achieved, thereby making it possible to provide the conductive polymer actuator having driving force in the expansion direction and rigidity in the contraction direction without application of preloads.

According to a fourth aspect of the present invention, there is provided the conductive polymer actuator as defined in the first aspect, wherein the connection between the first and second displacement extraction members is a connection via an elastic member.

According to such structure, although displacements are reduced due to elastic force, the driving force in the expansion direction of one conductive polymer film can be generated by the driving force in the contraction direction of the other conductive polymer film. Further, when external force is applied to the contraction direction of one conductive polymer film, the external force can be received by the rigidity in the expansion direction of the other conductive polymer film, thereby making it possible to provide the actuator having driving force in the expansion direction and rigidity in the contraction direction without application of preloads.

According to a fifth aspect of the present invention, there is the conductive polymer actuator as defined in the second aspect, wherein the first displacement extraction member holds respective end portions of the first conductive polymer film and is electrically connected thereto, while the second displacement extraction member holds respective end portions of the second conductive polymer film and is electrically connected thereto, and the link mechanism constitutes a parallel link mechanism with coupling members, in which the adjacent first displacement extraction member and second displacement extraction member are coupled together through the coupling members having an identical length.

According to a sixth aspect of the present invention, there is provided the conductive polymer actuator as defined in any one of the first to fifth aspects, wherein the first conductive polymer film and the second conductive polymer film are arranged alternately in thickness direction.

According to such structure, both surfaces of the first conductive polymer film face the second conductive polymer films, and similarly, both surfaces of the second conductive polymer film face the first conductive polymer films, which makes it possible to provide the conductive polymer actuator multilayered at high density.

According to a seventh aspect of the present invention, there is provided the conductive polymer actuator as defined in any one of the first to sixth aspects, wherein the first conductive polymer film and the second conductive polymer film are arranged in parallel.

According to such structure, a distance between adjacent conductive polymer films is made constant, which reduces dispersion in reaction on the same surface of the conductive polymer film, thereby making it possible to provide the conductive polymer actuator with more stable output.

According to an eighth aspect of the present invention, there is provided the conductive polymer actuator as defined in the seventh aspect, wherein the first conductive polymer film and the second conductive polymer film are arranged at regular intervals.

According to such structure, all the distances between adjacent conductive polymer films can be minimized, which makes it possible to provide the conductive polymer actuator multilayered at higher density.

According to a ninth aspect of the present invention, there is provided the conductive polymer actuator as defined in any one of the first to eighth aspects, wherein the displacement directions of the first displacement extraction member and the second displacement extraction member are equal to longitudinal directions of the first conductive polymer film and the second conductive polymer film, respectively.

According to such structure, the direction in which expansion and contraction generated by swell and shrinkage of the conductive polymer film is maximized is used, which makes it possible to provide the conductive polymer actuator in which unnecessary distortion inside the actuator becomes small.

According to a tenth aspect of the present invention, there is provided the conductive polymer actuator as defined in any one of the first to ninth aspects, wherein the displacement directions of the first displacement extraction member and the second displacement extraction member are orthogonal.

According to such structure, unnecessary moment is prevented from being generated during conversion of load direction or displacement direction, thereby making it possible to provide the conductive polymer actuator utilizing rigidity and generative force of conductive polymer films without wasting.

According to an eleventh aspect of the present invention, there is provided the conductive polymer actuator as defined in any one of the first to tenth aspects, wherein either one of or both the first displacement extraction member and the second displacement extraction member are connected to a guide mechanism which is movable only in displacement direction of the respective displacement extraction members.

According to such structure, displacements except those in a target direction are controlled by the guide mechanism, which makes it possible to provide the conductive polymer actuator with driving force acting only on the displacement direction.

According to a twelfth aspect of the present invention, there is provided a robot, comprising:

a robot arm; and a pair of robot arm driving units structured to have an antagonist muscle structure composed of a pair of conductive polymer actuators as defined in any one of the first to fifth aspects.

According to such structure, the conductive polymer actuator capable of fulfilling the above-described various effects is applicable to the robot arm as the driving unit having the antagonist muscle structure composed of the pair of the conductive polymer actuators. As a result, by utilizing multiple degree of freedom, it becomes possible to provide the robot arm performing smooth operation like human arms. By this, it becomes possible to realize a robot arm particularly appropriate for household use.

Hereinbelow, various embodiments of the present invention will be described in detail with reference to the drawings.

First Embodiment

Figure 2A:
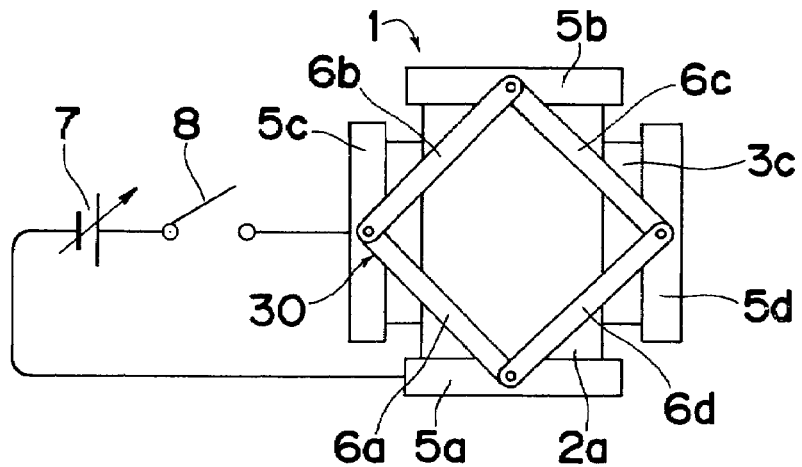
FIG. 2A is a top view for showing the outline of the artificial muscle actuator according to the first embodiment of the present invention.
Figure 2B:
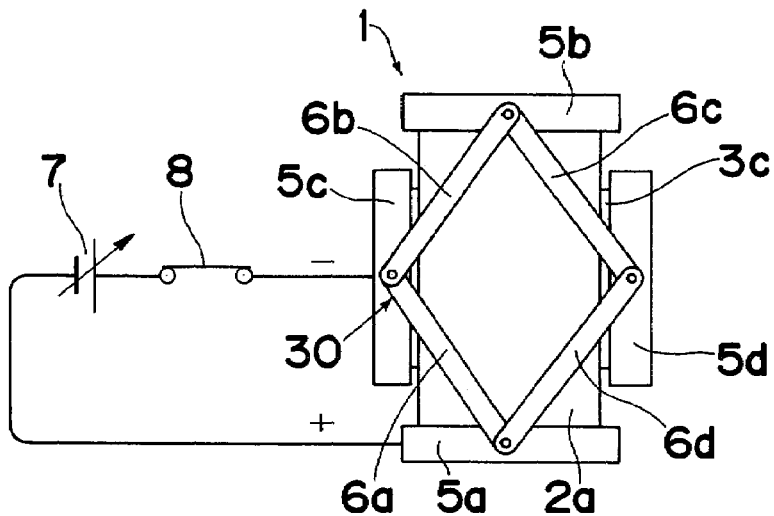
FIG. 2B is a top view for showing the outline of the artificial muscle actuator according to the first embodiment of the present invention.
Figure 2C:
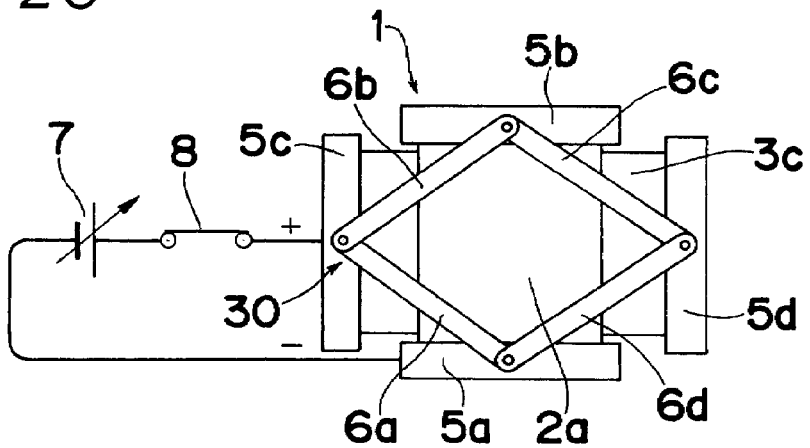
FIG. 2C is a top view for showing the outline of the artificial muscle actuator according to the first embodiment of the present invention.

FIG. 1 is a perspective view showing the outline of an artificial muscle actuator 1 serving as one example of a conductive polymer actuator in a first embodiment of the present invention. The top view thereof is shown in FIG. 2A to FIG. 2C.

In FIG. 1, reference numerals 2a to 2d and 3a to 3c denote film-like stretch boards, which are oblong, e.g., rectangular, stretch members made of conductive polymers which swell and shrink with an oxidation-reduction reaction. As the conductive polymers constituting the stretch boards 2a to 2d and 3a to 3c that are conductive polymer films, polypyrrole, polyaniline, polymethoxyaniline, or the like can be used, and among these, the polypyrrole is desirable as it offers large displacements. Moreover, it is desirable that the conductive polymer stretch boards 2a to 2d and 3a to 3c respectively have a thickness of about several dozen μm. If the thickness is smaller than this, the stretch boards are not strong enough and if the thickness is larger than this, then ions cannot sufficiently go into the inside of the conductive polymer stretch boards 2a to 2d and 3a to 3c, which are not desirable.

The conductive polymer stretch boards 2a to 2d and 3a to 3c are alternately arranged so as to be laminated via gel electrolytes 4a to 4f serving as one example of the electrolyte holding layer. The thickness of the gel electrolytes 4a to 4f is preferably about several dozen μm to several mm, and if the thickness is larger than this, then conductive polymer stretch boards cannot be arranged at high density, resulting in reduction in generative force of the actuator. If the thickness is too small, then ratio of ions contained in the gel electrolyte decreases, resulting in reduction in displacements of the actuator. The conductive polymer stretch boards 2a to 2d and 3a to 3c are made to have a totally identical shape and an identical thickness from an identical material, and are arranged in parallel and at regular intervals so that the respective longitudinal directions are orthogonal to each other with 90-degree difference in phase. Moreover, the gel electrolyte holding layer 4a to 4f are also made to have a totally identical shape and an identical thickness from an identical material, and are arranged in parallel and at regular intervals. The size of the gel electrolyte holding layer 4a to 4f is set almost equal to the size of overlap portions between the conductive polymer stretch boards 2a to 2d and the stretch boards 3a to 3c when the stretch boards 2a to 2d and the stretch boards 3a to 3c are arranged orthogonally to each other. Consequently, the conductive polymer stretch boards 2a to 2d and 3a to 3c and the gel electrolyte holding layer 4a to 4f share almost the same central axis, and are arranged, from top to bottom in the drawing, in the order of the conductive polymer stretch board 2a, the gel electrolyte holding layer 4a, the conductive polymer stretch board 3a, the gel electrolyte holding layer 4b, the conductive polymer stretch board 2b, the gel electrolyte holding layer 4c, the conductive polymer stretch board 3b, the gel electrolyte holding layer 4d, the conductive polymer stretch board 2c, the gel electrolyte holding layer 4e, the conductive polymer stretch board 3c, the gel electrolyte holding layer 4f, and the conductive polymer stretch board 2d. With such arrangement, dispersion in reaction in the conductive polymer stretch boards 2a to 2d and 3a to 3c is reduced. Moreover, since intervals between adjacent conductive polymer stretch boards 2a to 2d and 3a to 3c are constant, lamination with waste avoided is possible, which allows high-density mounting.

Both sides of the conductive polymer stretch boards 2a to 2d are respectively held by metal structures 5a, 5b serving as one example of the displacement extraction members and are electrically connected thereto. Similarly, both sides of the conductive polymer stretch boards 3a to 3c are respectively held by metal structures 5c, 5d serving as one example of the displacement extraction members and are electrically connected thereto. Examples of a method for holding conductive polymer stretch boards by the metal structures include a method in which the metal structures 5a to 5d are each composed of a plurality of metal blocks and the metal blocks are integrated with the conductive polymer stretch boards 2a to 2d and 3a to 3c being interposed in between the metal blocks to make the metal structures. As a method for integrating the metal blocks, screwing, welding, pressure bonding, adhesive joining, or the like may be used. As a material of the metal structures and metal blocks, metals such as platinum, titanium, nickel, or stainless steel may be used, though the stainless steel is desirable as it is inexpensive.

The displacement direction of the metal structures 5a, 5b is equal to the longitudinal direction of the conductive polymer stretch boards 2a to 2d, whereas the displacement direction of the metal structures 5c, 5d is equal to the longitudinal direction of the conductive polymer stretch boards 3a to 3c, and the displacement directions of the metal structures 5a, 5b and the metal structures 5c, 5d are arranged orthogonally to each other. In consideration of displacing both the metal structures 5a, 5b and the metal structures 5c, 5d, deformations of the conductive polymer stretch boards 2a to 2d and 3a to 3c in directions different from the displacement directions of the metal structures 5a, 5b and the metal structures 5c, 5d are not desirable as they cause unnecessary strain. Accordingly, by using directions which maximize the deformations of the conductive polymer stretch boards 2a to 2d and 3a to 3c, i.e., expansion directions, as the displacement directions of the metal structures 5a to 5d, the unnecessary strain inside the actuator is made smaller.

The metal structures 5a to 5d are rotatably connected via coupling bars 6a to 6d with an identical length, which serve as one example of the insulative coupling members, at the center of each top surface by pins 20, and the coupling bars 6a to 6d are combined so as to constitute a parallelogram frame, which makes a four-bar linkage mechanism 30. In the same manner, on the back surface of the metal structures 5a to 5d (the lower surface side of the metal structures 5a to 5d in the drawing), another link mechanism 30 is mounted with another insulative coupling bars 6a to 6d with an identical length coupled at the center of each lower surface by pins 20. With such structure, it becomes possible not to waste and to utilize rigidity and generative force of the conductive polymer stretch boards 2a to 2d and 3a to 3c without generating unnecessary moment during conversion of load direction and displacement direction.

Moreover, an interconnection line connected to the metal structure 5a is connected to one pole of a power source 7. The other pole of the power source 7 is connected to the metal structure 5c via a switch 8.

Next, description will be given of the operation of the artificial muscle actuator 1.

Shrinkage of the conductive polymer stretch boards 2a to 2d and 3a to 3c is caused by entrance and exit of anions (negative ions), entrance and exit of cations (positive ions), change of polymer structure, and the like. In description of operation principles in FIG. 2A, FIG. 2B, and FIG. 2C, doping and un-doping of anions in materials such as polypyrrole are main mechanisms of deformation, and so description will be given of the entrance and exit of anions.

FIG. 2A shows a switch-off state in which voltage is not applied to the conductive polymer stretch boards 2a to 2d and 3a to 3c, while FIG. 2B shows the case where a positive potential is applied to the conductive polymer stretch boards 2a to 2d and a negative potential is applied to the conductive polymer stretch boards 3a to 3c. Moreover, FIG. 2C shows the case where a negative potential is applied to the conductive polymer stretch boards 2a to 2d and a positive potential is applied to the conductive polymer stretch boards 3a to 3c.

Figure 12A:
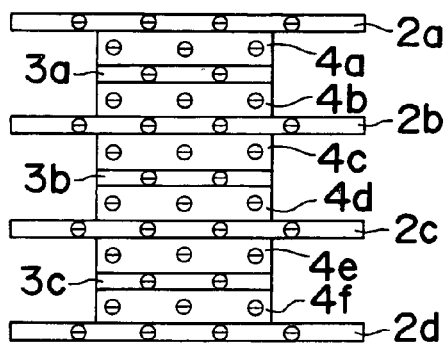
FIG. 12A is a view for showing a stretch board of conductive polymers in expanding/contracting state with the movement of anions in the artificial muscle actuator according to the first embodiment of the present invention.
Figure 12B:
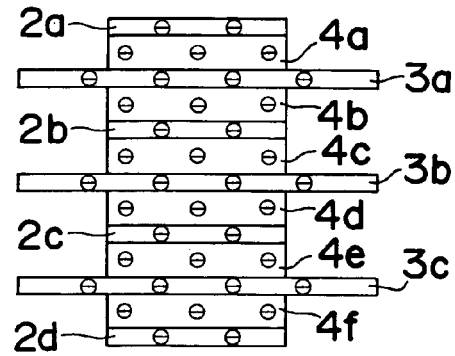
FIG. 12B is a view for showing the stretch board of conductive polymers in expanding/contracting state with the movement of anions in the artificial muscle actuator according to the first embodiment of the present invention.
Figure 12C:
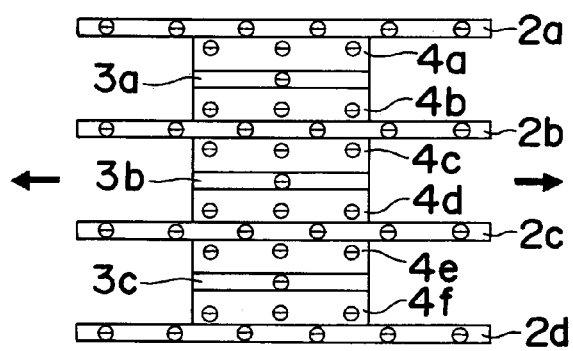
FIG. 12C is a view for showing the stretch board of conductive polymers in expanding/contracting state with the movement of anions in the artificial muscle actuator according to the first embodiment of the present invention.
Figure 12D:
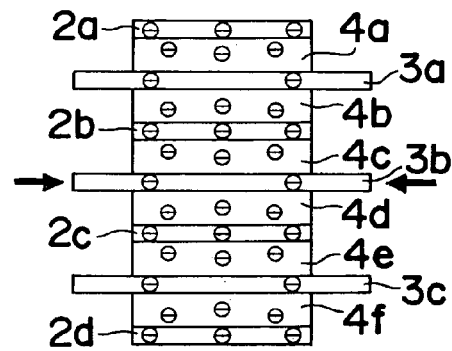
FIG. 12D is a view for showing the stretch board of conductive polymers in expanding/contracting state with the movement of anions in the artificial muscle actuator according to the first embodiment of the present invention.
Figure 12E:
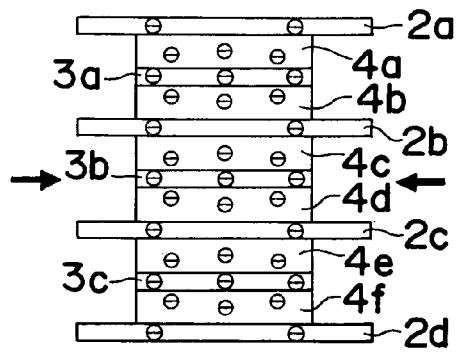
FIG. 12E is a view for showing the stretch board of conductive polymers in expanding/contracting state with the movement of anions in the artificial muscle actuator according to the first embodiment of the present invention.
Figure 12F:
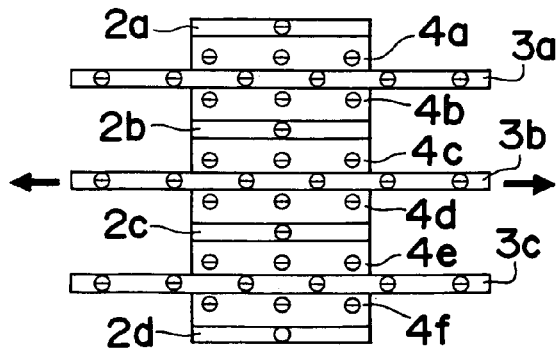
FIG. 12F is a view for showing the stretch board of conductive polymers in expanding/contracting state with the movement of anions in the artificial muscle actuator according to the first embodiment of the present invention.

The behaviors of ions in FIG. 2A, FIG. 2B, and FIG. 2C are shown in FIG. 12A to FIG. 12F. More particularly, FIG. 12A, FIG. 12B and FIG. 12C, FIG. 12D and FIG. 12E, and FIG. 12F correspond to FIG. 2A, FIG. 2B, and FIG. 2C, respectively. FIG. 12A, FIG. 12C, and FIG. 12E are views showing displacements of the stretch boards 2a to 2d in longitudinal direction, whereas FIG. 12B, FIG. 12D, and FIG. 12F are views showing displacements of the conductive polymer stretch boards 3a to 3c in longitudinal direction with 90-degree difference in phase from FIG. 12A, FIG. 12C, and FIG. 12E. As shown in these drawings, each of the conductive polymer stretch boards 2a to 2d and 3a to 3c expands by anions going into the inside and shrinks by anions being discharged from the inside. More specific description is as shown below.

First, when a potential is applied to the conductive polymer stretch boards 2a to 2d and 3a to 3c as shown in FIG. 2B, FIG. 12C, and FIG. 12D from the switch-off state with no voltage applied in FIG. 2A, FIG. 12A, and FIG. 12B, anions evenly present in the gel electrolyte holding layer 4a to 4f when no voltage is applied are pulled toward the conductive polymer stretch boards 2a to 2d on the positive electrode side and go into the inside of this conductive polymer stretch boards 2a to 2d. Along with the oxidative process, the conductive polymer stretch boards 2a to 2d expand all at once in the longitudinal direction. From the conductive polymer stretch boards 3a to 3c on the negative electrode side, anions present inside are discharged to the gel electrolyte holding layer 4a to 4f. Along with this reduction process, the conductive polymer stretch boards 3a to 3c shrink in the longitudinal direction. As a result of these expansion and shrinkage, the coupling bars 6a to 6d in the link mechanism 30 having a square shape when no voltage is applied are changed to have a vertically-long parallelogram as shown in FIG. 2B.

The conductive polymer stretch boards 2a to 2d and 3a to 3c are film-like substances, and therefore cannot generate driving force in the expansion direction. However, the shrinkage of the conductive polymer stretch boards 3a to 3c are converted to the motion in the expansion direction (i.e., vertical direction in FIG. 2B) of the conductive polymer stretch boards 2a to 2d by the four-bar link mechanism 30 composed of four coupling bars 6a to 6d, as a result of which the artificial muscle actuator 1 deforms in the expansion direction of the conductive polymer stretch boards 2a to 2d and generates driving force.

Moreover, FIG. 2C, FIG. 12E, and FIG. 12F show the case where a negative potential is applied to the conductive polymer stretch boards 2a to 2d while a positive potential is applied to the conductive polymer stretch boards 3a to 3c. Contrary to the case of FIG. 2B, anions evenly present in the gel electrolyte holding layer 4a to 4f when no voltage is applied are pulled toward the conductive polymer stretch boards 3a to 3c on the positive electrode side and go into the inside of the conductive polymer stretch boards 3a to 3c. Along with the oxidative process, the conductive polymer stretch boards 3a to 3c expand. From the conductive polymer stretch boards 2a to 2d on the negative electrode side, anions present inside are discharged to the gel electrolyte holding layer 4a to 4f. Along with the reduction process, the conductive polymer stretch boards 2a to 2d shrink. As a result of these expansion and shrinkage, the coupling bars 6a to 6d in the link mechanism 30 having a square shape when no voltage is applied are changed to have a vertically-long parallelogram as shown in FIG. 2C.

The shrinkage of the conductive polymer stretch boards 2a to 2d are converted to the motion in the expansion direction (i.e., lateral direction in FIG. 2C) of the conductive polymer stretch boards 3a to 3c by the four-bar link mechanism 30 composed of four coupling bars 6a to 6d. However, since the conductive polymer stretch boards 3a to 3c expand, they do not disturb shrinkage of the conductive polymer stretch boards 2a to 2d, as a consequence of which the artificial muscle actuator 1 deforms in the shrinkage direction (i.e., lateral direction in FIG. 2C) of the conductive polymer stretch boards 2a to 2d and generates driving force.

Contrary to this, in the case where external force in the shrinkage direction (i.e., vertical direction in FIG. 2C) of the conductive polymer stretch boards 2a to 2d is applied to the actuator 1, the external force is received by rigidity in the expansion direction (i.e., lateral direction in FIG. 2C) of the conductive polymer stretch boards 3a to 3c via the four-bar link mechanism 30 composed of the coupling bars 6a to 6d even though the conductive polymer stretch boards 2a to 2d do not have rigidity in the shrinkage direction. Moreover, as for external force in the expansion direction of the conductive polymer stretch boards 2a to 2d, it is received by rigidity of the conductive polymer stretch boards 2a to 2d.

Thus, according to the first embodiment, the metal structures 5a, 5b that are the first displacement extraction member connected to the stretch members 2a to 2d that are the first conductive polymer film, and the metal structures 5c, 5d that are the second displacement extraction member connected to the stretch members 3a to 3c that are the second conductive polymer film are arranged so as to have different displacement directions, and the four-bar link mechanism 30 composed of the coupling bars 6a to 6d is provided so that the metal structures 5a, 5b and 5c, 5d, that are the first and second displacement extraction members, reciprocally convert the swell-directional displacements of one structure to the shrink-directional displacements of the other structure. With such structure, two kinds of conductive polymers 2a to 2d and 3a to 3c, one of which swells and the other of which shrinks by the oxidation-reduction reaction, can be connected via the link mechanism 30 which reciprocally converts the shrink-directional displacements of one conductive polymer film to the swell-directional displacements of other conductive polymer film, so that the driving force in the expansion direction of one conductive polymer film can be generated by the driving force in the contraction direction of the other conductive polymer film. More particularly, the deformations of the conductive polymer stretch boards 2a to 2d in the shrinkage direction are reciprocally converted to the deformations of the conductive polymer stretch boards 3a to 3c in the expansion direction with the four-bar link mechanism 30, while the deformations of the conductive polymer stretch boards 2a to 2d in the expansion direction are also converted to the deformations of the conductive polymer stretch boards 3a to 3c in the shrinkage direction with the four-bar link mechanism 30, so that the driving force in the expansion direction of the stretch members 2a to 2d or 3a to 3c, that is one conductive polymer film, can be generated by the driving force in the contraction direction of the stretch members 3a to 3c or 2a to 2d, that is the other conductive polymer film. Further, in the case where external force is applied to the contraction direction of the stretch members 2a to 2d or 3a to 3c, that is one conductive polymer film, the external force can be received by rigidity in the expansion direction of the stretch members 3a to 3c or 2a to 2d, that is the other conductive polymer film, thereby making it possible to provide a conductive polymer actuator having driving force in the expansion direction and rigidity in the contraction direction without application of preloads.

Although in the first embodiment, description has been given of the method for holing the conductive polymer stretch boards 2a to 2d and 3a to 3c in the state of being interposed in between the displacement extraction members 5a, 5b and 5c, 5d, the holding method is not limited thereto, and so the displacement extraction members may be held by being inserted into hole portions provided in conductive polymer stretch boards. Moreover, a displacement extraction member may be inserted into a ring portion formed by folding a conductive polymer stretch board or a conductive polymer stretch board may be inserted into a hole portion provided in a displacement extraction member and thereafter a stopper is put thereon to prevent extraction of the conductive polymer stretch board, so that the conductive polymer stretch board may be held only for movement of the displacement extraction member in the expansion direction or for shrinkage of the conductive polymer stretch board. Moreover, although the link mechanism 30 is mounted on both the surfaces in the first embodiment, the link mechanism 30 is not necessarily required to be mounted on both the surface but may be mounted on one surface. Further, the coupling bars 6a to 6d are not necessarily required to be insulative as long as both the poles of the power source 7 do not short-circuit, and therefore the coupling portions to the displacement extraction members 5a, 5b, 5c, 5d may be made insulative. The displacement extraction members are not necessarily required to be metal substances, as long as they have interconnection portions for connecting the power source 7 and the conductive polymer stretch boards. Moreover, interconnection lines may be directly connected to the conductive polymer stretch boards and connection to the displacement extraction members may be eliminated. These cases are all included in the present invention.

Second Embodiment

Figure 3A:
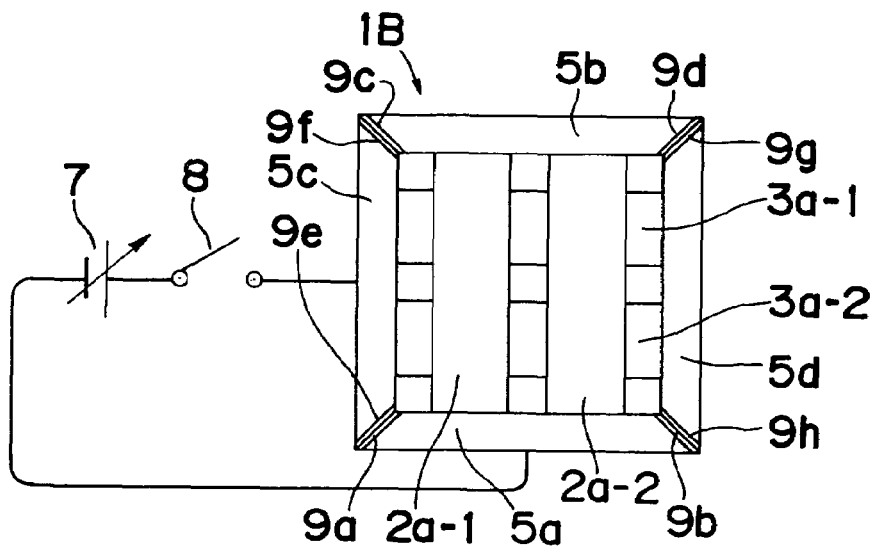
FIG. 3A is a top view for showing the outline of an artificial muscle actuator according to a second embodiment of the present invention.
Figure 3B:
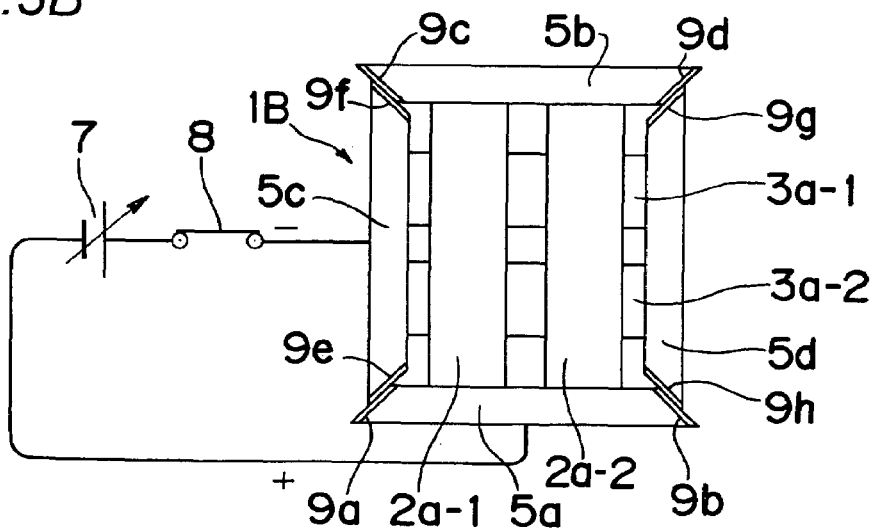
FIG. 3B is a top view for showing the outline of the artificial muscle actuator according to the second embodiment of the present invention.
Figure 3C:
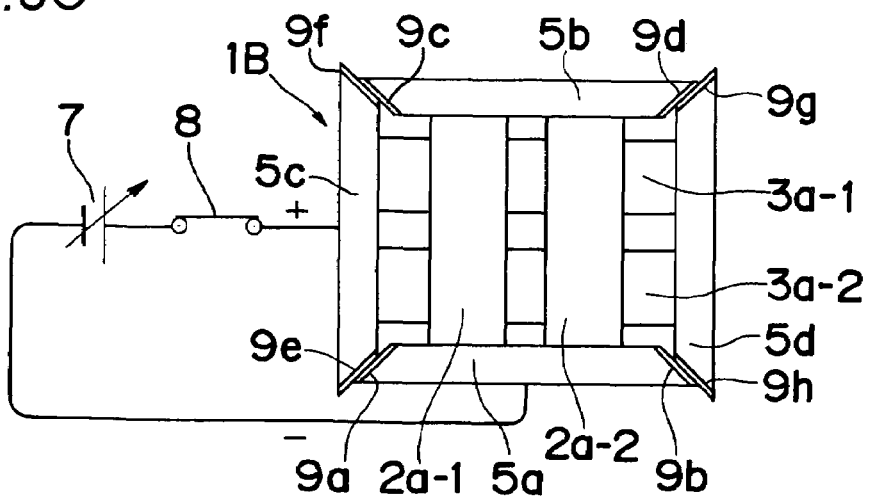
FIG. 3C is a top view for showing the outline of the artificial muscle actuator according to the second embodiment of the present invention.

FIG. 3A to 3C are top views showing the outline of an artificial muscle actuator 1B serving as one example of a conductive polymer actuator in a second embodiment of the present invention. It is to be understood that component members fulfilling the functions identical to those in the aforementioned first embodiment are designated by identical reference numerals and redundant description is omitted.

In the second embodiment, instead of the four-bar link mechanism 30 composed of the coupling bars 6a to 6d in the first embodiment, metal structures 5a to 5d serving as one example of the displacement extraction member are disposed so that end portions thereof are in contact with each other.

On respective contact faces, insulative plate-like sliding members 9a to 9h are mounted. More particularly, the sliding members 9a, 9b are respectively fixed onto the contact faces on both the side portions of the metal structure 5a, the sliding members 9c, 9d are respectively fixed onto the contact faces on both the side portions of the metal structure 5b, the sliding members 9e, 9f are respectively fixed onto the contact faces on both the side portions of the metal structure 5c, and the sliding members 9g, 9h are respectively fixed onto the contact faces on -both the side portions of the metal structure 5d. Therefore, the sliding member 9a and the sliding member 9e face each other slidably between the metal structure 5a and the metal structure 5c, the sliding member 9f and the sliding member 9c face each other slidably between the metal structure 5c and the metal structure 5b, the sliding member 9d and the sliding member 9g face each other slidably between the metal structure 5b and the metal structure 5d, and the sliding member 9h and the sliding member 9b face each other slidably between the metal structure 5d and the metal structure 5a. As materials of the respective sliding members 9a to 9h, fluororesin or the like is desirable as it has low friction characteristics and chemical resistance. An angle between the contact faces is the angle different from an angle between displacement directions of the metal structures 5a to 5d (e.g., an angle inclined 45 degrees to a displacement direction), and when external force in the shrinkage direction of conductive polymer stretch boards 2a-1, 2a-2 is applied to the artificial muscle actuator 1B, displacements in the expansion direction are generated on conductive polymer stretch boards 3a-1, 3a-2. With this, the applied external force is received by rigidity of the conductive polymer stretch boards 3a-1, 3a-2. Moreover, in the case where a positive voltage is applied to the conductive polymer stretch boards 2a-1, 2a-2 and thereby the conductive polymer stretch boards 2a-1, 2a-2 expand, a negative voltage is applied at the same time to the conductive polymer stretch boards 3a-1, 3a-2 and thereby the conductive polymer stretch boards 3a-1, 3a-2 shrink, so that the metal structures 5a, 5b are displaced in the expansion direction of the conductive polymer stretch boards 2a-1, 2a-2 as the metal structures 5c, 5d are displaced in the shrinkage direction of the conductive polymer stretch boards 3a-1, 3a-2. The conductive polymer stretch boards 2a to 2d and 3a to 3c in the second embodiment are in the state formed by dividing the respective conductive polymers 2a to 2d and 3a to 3c in the first embodiment into two portions, that is, the conductive polymer stretch boards 2a to 2d and 3a to 3c are respectively made up of parallely-arranged two stretch boards 2a-1, 2a-2, 2b-1, 2b-2, 2c-1, 2c-2, 2d-1, 2d-2, 3a-1, 3a-2, 3b-1, 3b-2, 3c-1, and 3c-2. Such arrangement makes it possible to exert more control over swell in directions different from displacement directions. Without being limited to division into two portions, the conductive polymers may be divided into smaller portions where necessary or may be left without division. Moreover, while spaces are provided between the conductive polymer stretch boards 2a-1 and 2a-2 and between the stretch boards 3a-1 and 3a-2 in FIG. 3A to FIG. 3C, these spaces are not essential.

As described above, according to the second embodiment, deformations of the conductive polymer stretch boards 2a-1, 2a-2 in the shrinkage direction are reciprocally converted to deformations of the conductive polymer stretch boards 3a-1, 3a-2 in the expansion direction, while at the same time, deformations of the conductive polymer stretch boards 2a-1, 2a-2 in the expansion direction are also reciprocally converted to deformations of the conductive polymer stretch boards 3a-1, 3a-2 in the shrinkage direction, by which driving force in the expansion direction of the stretch board, that is one conductive polymer film, can be generated by the driving force in the shrinkage direction of the stretch board, that is the other conductive polymer film. Further, in the case where external force is applied to the shrinkage direction of the stretch board, that is one conductive polymer film, the external force can be received by rigidity in the expansion direction of the stretch board, that is the other conductive polymer film, thereby making it possible to provide a conductive polymer actuator having driving force in the expansion direction and rigidity in the contraction direction without application preloads.

Although in the second embodiment, the sliding members 9a to 9h are put on the end portions of the metal structures 5a to 5d, that are displacement extraction members, they may be spherical or cylindrical members which achieve rolling contact. Moreover, the displacement extraction members are not necessarily required to be metal members as long as they have interconnection portions for connecting the power source 7 and the conductive polymer stretch boards 2a to 2d and 3a to 3c. Further, by forming the displacement extraction members from fluororesin or the like, direct contact may be achieved without use of the sliding members.

Moreover, a method for mutually connecting the displacement extraction members is not limited to by contact but may be mutual connection by non-contact physical actions. As such physical actions, repulsion of magnets, electrostatic repulsion, or the like may be used.

These cases are all included in the present invention.

Third Embodiment

Figure 4A:
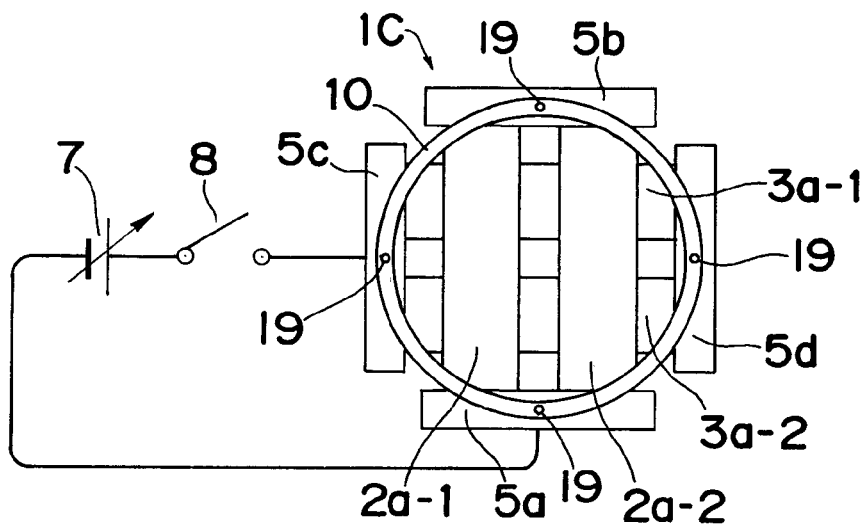
FIG. 4A is a top view for showing the outline of an artificial muscle actuator according to a third embodiment of the present invention.
Figure 4B:
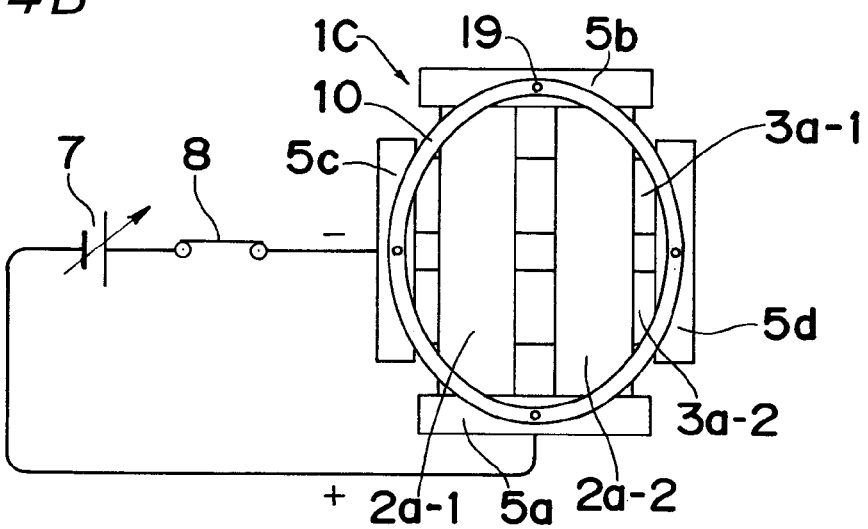
FIG. 4B is a top view for showing the outline of the artificial muscle actuator according to the third embodiment of the present invention.
Figure 4C:
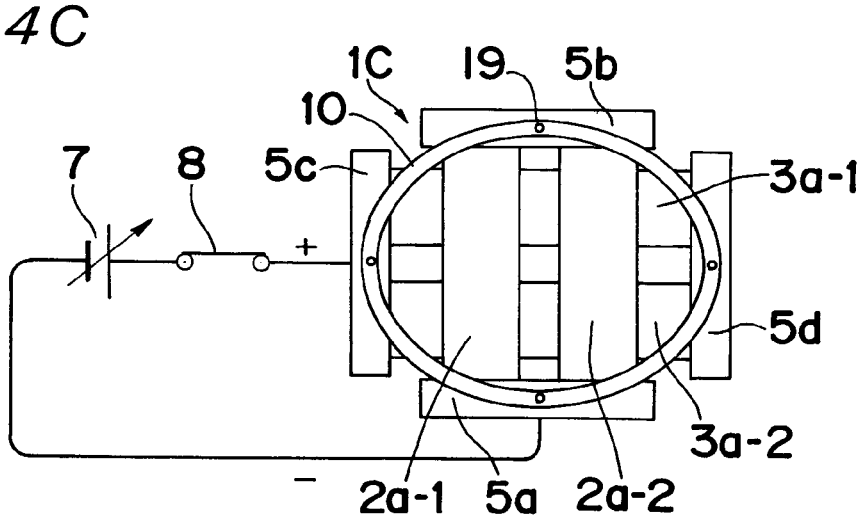
FIG. 4C is a top view for showing the outline of the artificial muscle actuator according to the third embodiment of the present invention.

FIG. 4A to FIG. 4C are top views showing the outline of an artificial muscle actuator 1C serving as one example of a conductive polymer actuator in a third embodiment of the present invention. It is to be understood that component members fulfilling the functions identical to those in the aforementioned embodiment are designated by identical reference numerals and redundant description is omitted.

In the third embodiment, instead of the four-bar link mechanism 30 composed of the coupling bars 6a to 6d in the first embodiment, metal structures 5a to 5d are coupled via a single elastic ring 10 serving as one example of the insulative elastic member. More specifically, the single elastic ring 10 and the top surfaces, i.e., the center portions, of the respective metal structures 5a to 5d are fixed by pins 19. When external force in the shrinkage direction of conductive polymer stretch boards 2a-1, 2a-2 is applied to the artificial muscle actuator 1C, the elastic ring 10 shrinks in direction of the external force while expanding in the expansion direction of conductive polymer stretch boards 3a-1, 3a-2. With this, the applied external force is received by rigidity of the conductive polymer stretch boards 3a-1, 3a-2. Moreover, when a positive voltage is applied to the conductive polymer stretch boards 2a-1, 2a-2 and thereby the conductive polymer stretch boards 2a-1, 2a-2 expand, a negative voltage is applied at the same time to the conductive polymer stretch boards 3a-1, 3a-2 and thereby the conductive polymer stretch boards 3a-1, 3a-2 shrink, by which the metal structures 5a, 5b are displaced in the expansion direction of the conductive polymer stretch boards 2a-1, 2a-2 as the metal structures 5c, 5d are displaced in the shrinkage direction of the conductive polymer stretch boards 3a-1, 3a-2.

As described above, according to the third embodiment, the deformations of the conductive polymer stretch boards 2a-1, 2a-2 in the shrinkage direction are reciprocally converted to the deformations of the conductive polymer stretch boards 3a-1, 3a-2 in the expansion direction, while at the same time, the deformations of the conductive polymer stretch boards 2a-1, 2a-2 in the expansion direction are also reciprocally converted to the deformations of the conductive polymer stretch boards 3a-1, 3a-2 in the shrinkage direction, by which driving force in the expansion direction of one conductive polymer stretch board can be generated by the driving force in the contraction direction of the other conductive polymer stretch board. Further, in the case where external force is applied to the contraction direction of one conductive polymer stretch board, the external force can be received by rigidity in the expansion direction of the other conductive polymer stretch board, which makes it possible to provide a conductive polymer actuator having driving force in the expansion direction and rigidity in the contraction direction without application of preloads.

It is to be noted that in the third embodiment, the elastic ring is not necessarily required to be insulative as long as both the poles of the power source 7 do not short-circuit, and therefore the coupling portions to the displacement extraction members may be made insulative or the displacement extraction members may made insulative. These cases are all included in the present invention.

Fourth Embodiment

Figure 5:
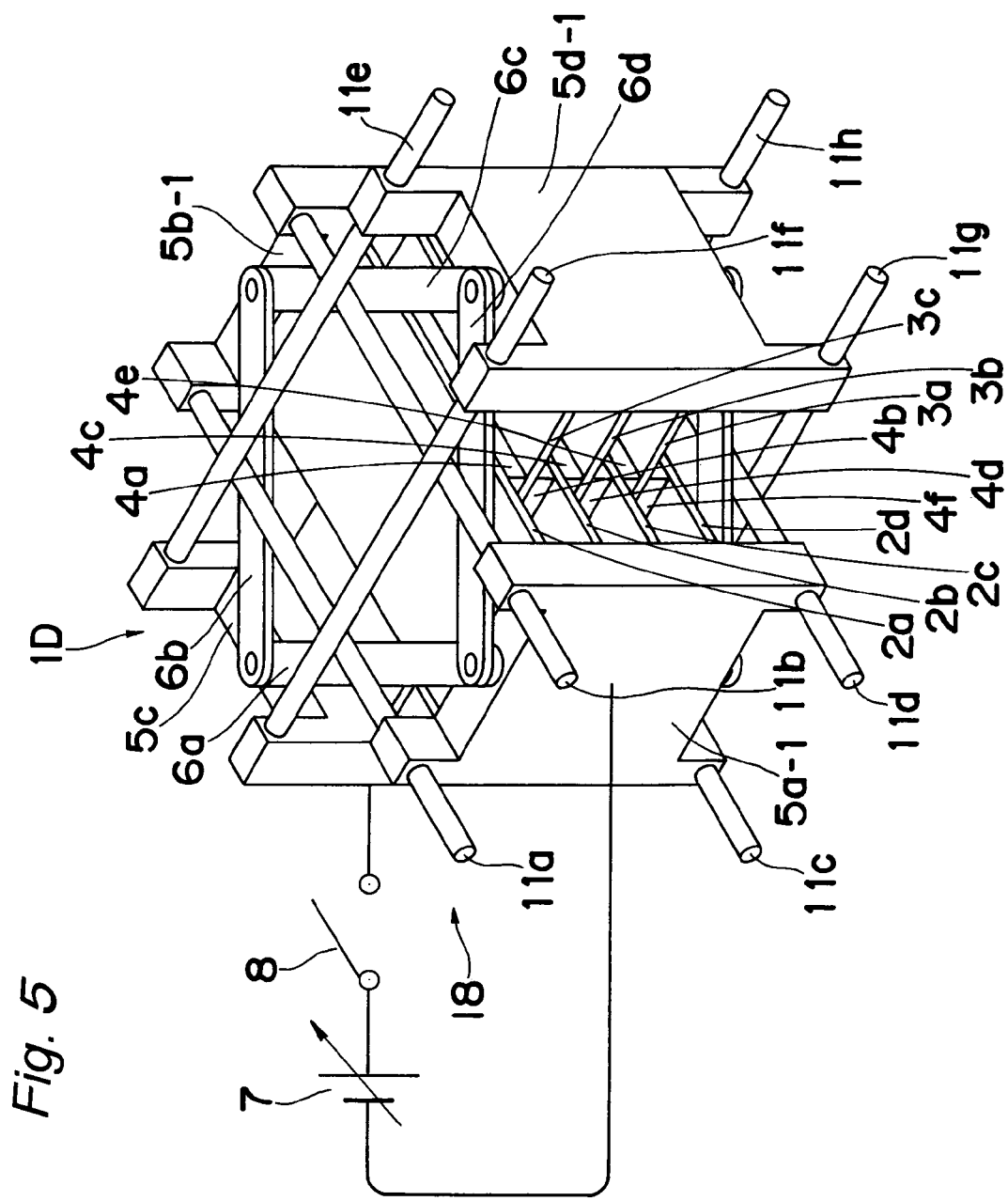
FIG. 5 is a perspective view for showing the outline of an artificial muscle actuator according to a fourth embodiment of the present invention.

FIG. 5 is a perspective view showing the outline of an artificial muscle actuator 1D serving as one example of a conductive polymer actuator in a fourth embodiment of the present invention. It is to be understood that component members fulfilling the functions identical to those in the aforementioned embodiment are designated by identical reference numerals and redundant description is omitted.

In the fourth embodiment, a guide mechanism 18 is added to the structure of the first embodiment. A metal structure 5b-1 is formed from an almost H-shaped metal plate member, and one ends of respective round bar-shaped guide rails 11a, 11b, 11c, 11d are fixed onto the protruding projection portions on the upper face side and the lower face side of the metal structure 5b-1. A metal structure 5a-1 is formed from an almost H-shaped metal plate member with a size almost identical to the metal structure 5b-1, and the other ends of the respective round bar-shaped guide rails 11a, 11b, 11c, 11d penetrate the protruding projection portions on the upper face side and the lower face side of the metal structure 5a-1 and are held by them via bearings (unshown). A metal structure 5c-1 is formed from an almost H-shaped metal plate member with a size larger than the metal structures 5b-1 and 5a-1, and one ends of respective round bar-shaped guide rails 11e, 11f, 11g, 11h are fixed onto the protruding projection portions on the upper face side and the lower face side of the metal structure 5c-1. A metal structure 5d-1 is formed from an almost H-shaped metal plate member with a size larger than the metal structures 5b-1 and 5a-1, and one ends of the respective round bar-shaped guide rails 11e, 11f, 11g, 11h penetrate the protruding projection portions on the upper face side and the lower face side of the metal structure 5d-1 and are held by them via bearings (unshown). More particularly, the guide rails 11e, 11f, 11g, 11h are arranged outside the guide rails 11a, 11b, 11c, 11d orthogonally to the guide rails 11*a*, 11*b*, 11*c*, 11*d*. Respective link mechanisms 30 are arranged inside the guide rails 11*a*, 11*b*, 11*c*, 11*d* so that moving operation of coupling bars 6*a*, 6*b*, 6*c*, 6*d* of the respective link mechanisms 30 are not in contact with the respective protrusion portions and the operation is not disturbed. The direction of the guide rails 11*a* to 11*d* is equal to the expansion and contraction direction of the conductive polymer stretch boards 2*a* to 2*d*, whereas the direction of the guide rails 11*e* to 11*h* is equal to the expansion and contraction direction of the conductive polymer stretch boards 3*a* to 3*c*. With such structure of the guide mechanism 18, the displacement directions of the metal structures 5*a*-1, 5*b*-1, 5*c*-1, 5*d*-1 are limited. More particularly, Even when driving force in directions different from specified displacement directions is applied to the metal structures 5*a*-1, 5*b*-1, 5*c*-1, 5*d*-1 due to dispersion in expansion and contraction of the conductive polymer stretch boards 2*a* to 2*d* and 3*a* to 3*c* or errors in each member, the metal structures 5*a*-1, 5*b*-1, 5*c*-1, 5*d*-1 are set to be displaced only in the expansion and contraction direction of the conductive polymer stretch boards 2*a* to 2*d* and 3*a* to 3*c*.

As described above, accordingly to the fourth embodiment, it becomes possible to provide a conductive polymer actuator having driving force in the expansion direction and rigidity in the contraction direction without application of preloads as with the case of the first embodiment while keeping the displacement directions of the displacement extraction members and the direction of the driving force from being affected by displacement dispersion generated by the conductive polymers or by structural errors.

Figure 6:
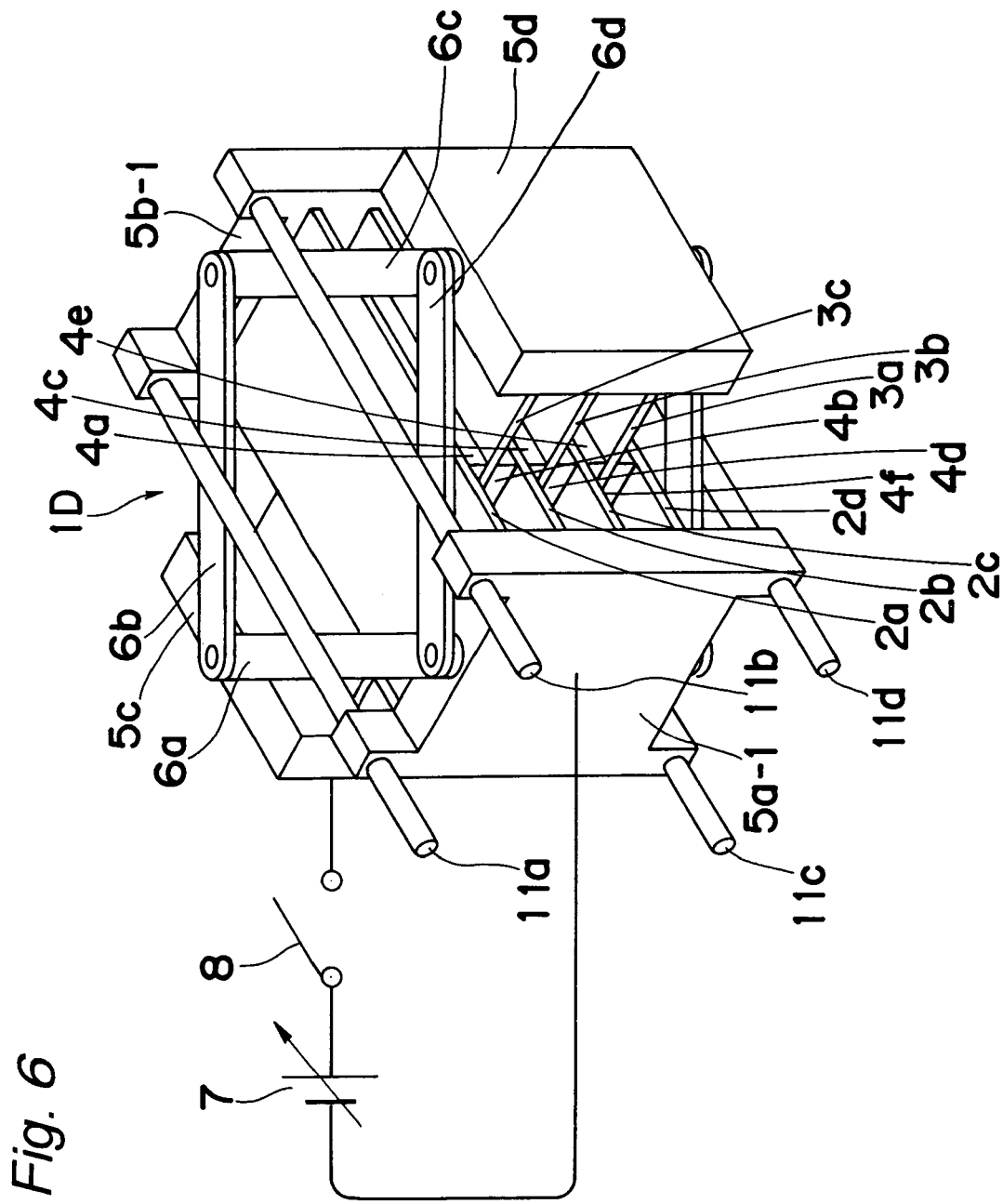
FIG. 6 is a perspective view for showing the outline of another structure of the artificial muscle actuator according to the fourth embodiment of the present invention.

Although the number of guide rails 11*a* to 11*d* and 11*e* to 11*h* is set at 4 in one direction in the fourth embodiment, it is not necessarily required to be 4 but to be 1 or more. Moreover, although the guides are disposed in two directions, the guides may be disposed only in one direction as shown in FIG. 6 in which the guide rails 11*a* to 11*d* are mounted only on the metal structures 5*a*-1 and 5*b*-1. Further, the guides are not necessarily required to be guide rails, and various linear guides are also applicable. These cases are all included in the present invention.

Fifth Embodiment

Figure 7:
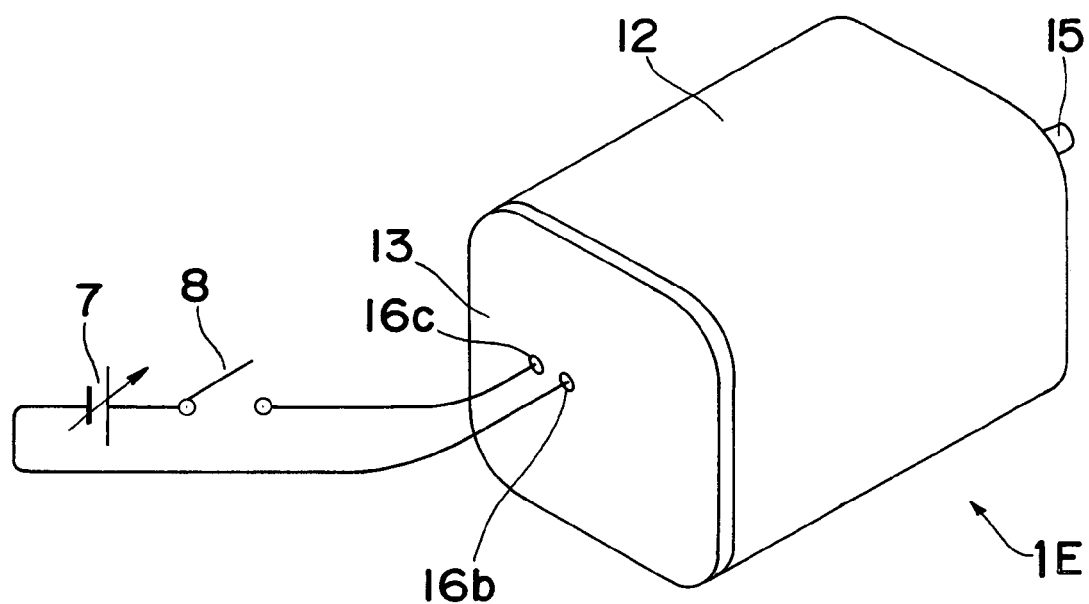
FIG. 7 is a perspective view for showing the outline of an artificial muscle actuator according to a fifth embodiment of the present invention.
Figure 8A:
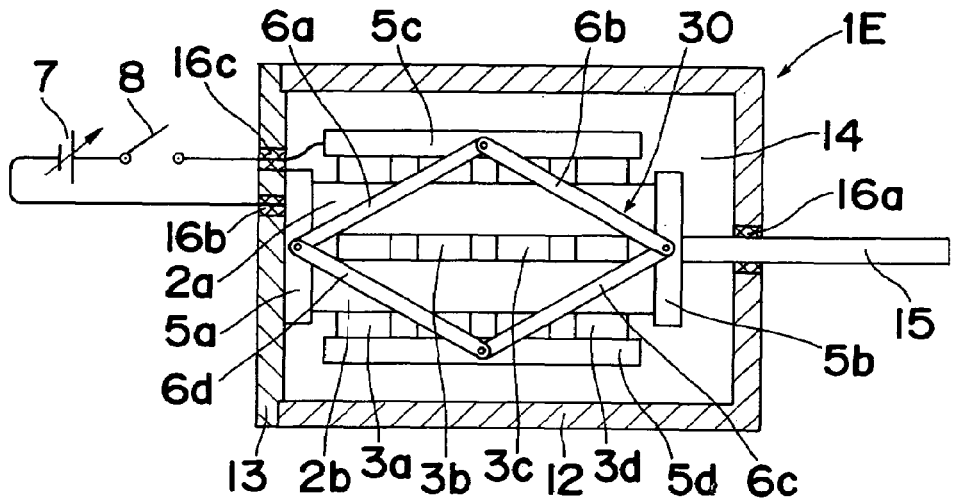
FIG. 8A is a partially cross sectional top view for showing the outline of the artificial muscle actuator according to the fifth embodiment of the present invention.
Figure 8B:
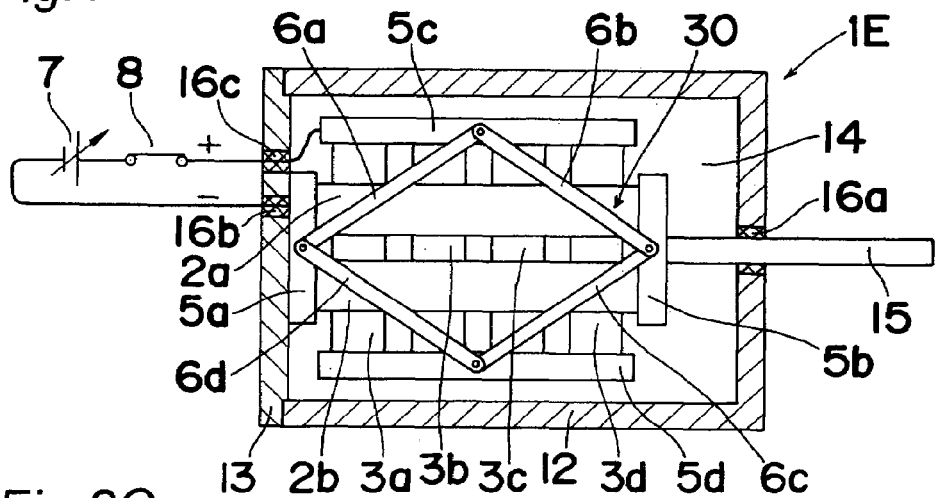
FIG. 8B is a partially cross sectional top view for showing the outline of the artificial muscle actuator according to the fifth embodiment of the present invention.
Figure 8C:
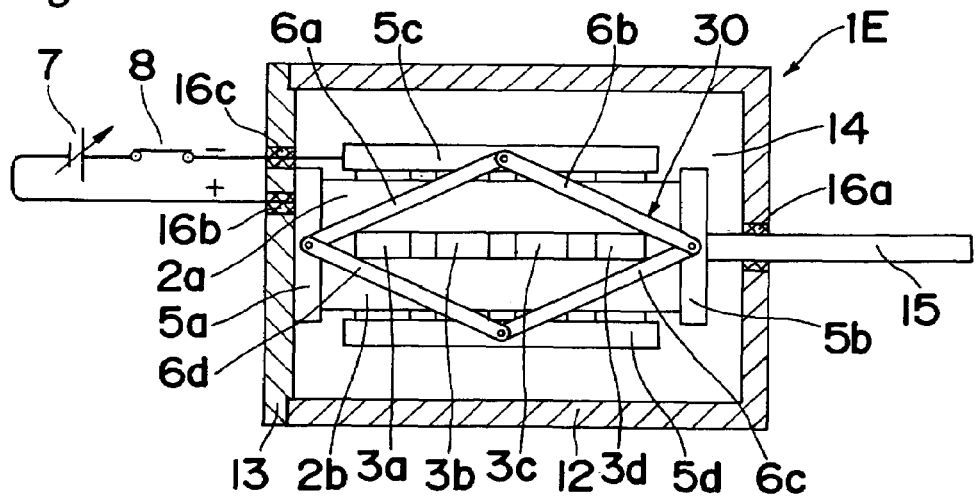
FIG. 8C is a partially cross sectional top view for showing the outline of the artificial muscle actuator according to the fifth embodiment of the present invention.

FIG. 7 is a perspective view for showing the outline of an artificial muscle actuator 1E serving as one example of a conductive polymer actuator in a fifth embodiment of the present invention. The cross sectional view thereof is shown in FIG. 8A, FIG. 8B, and FIG. 8C. More particularly, FIG. 8A shows a switch-off state in which voltage is not applied to conductive polymer stretch boards 2*a* to 2*b* and 3*a* to 3*c*, while FIG. 8B shows the case where a negative potential is applied to the conductive polymer stretch boards 2*a* to 2*b* and a positive potential is applied to the conductive polymer stretch boards 3*a* to 3*c*. Moreover, FIG. 8C shows the case where a positive potential is applied to the conductive polymer stretch boards 2*a* to 2*b* and a negative potential is applied to the conductive polymer stretch boards 3*a* to 3*c*. It is to be understood that component members fulfilling the functions identical to those in the aforementioned embodiment are designated by identical reference numerals and redundant description is omitted.

In each of FIG. 8A, FIG. 8B, and FIG. 8C, conductive polymer stretch boards 2*a* to 2*b* and 3*a* to 3*d* as well as rectangular metal boards 5*a* to 5*d* as another example of the displacement extraction member are arranged in a submerged state at almost the center portion in an electrolyte 14 as another example of the electrolyte holding layer which fills an enclosed space surrounded with a rectangular parallelepiped box-like case 12 and a rectangular plate-like cap 13. As the electrolyte 14, electrolytes such as NaPF6 or TBAPF6 being dissolved in water or organic solvents such as propylene carbonate, as well as ionic liquids such as BMIPF6 are usable. The electrolytes containing PF6 as anions are desirable as large displacements can be obtained in combination with polypyrrole that is a conductive polymer. Among four displacement extraction members 5*a* to 5*d*, the displacement extraction member 5*a* is fixed onto the inner surface of the cap 13 so as to be integrated with the cap 13.

A rod 15 is connected to the displacement extraction member 5*b*, and the rod 15 protrudes out of the case 12 through a seal member 16*a* placed on the case 12. An interconnection line connected to the displacement extraction member 5*a* is connected to one pole of a power source 7 through a seal member 16*b* provided on the cap 13. The other pole of the power source 7 is connected to the displacement extraction member 5*c* via a switch 8. An interconnection line for connecting the switch 8 and the displacement extraction member 5*c* connects the inside and the outside of the space surrounded with the case 12 and the cap 13 through a seal member 16*c* provided on the cap 13.

As a result, when a negative potential is applied to the conductive polymer stretch boards 2*a* to 2*b* and a positive potential is applied to the conductive polymer stretch boards 3*a* to 3*c* as shown in FIG. 8B from the switch-off state of FIG. 8A, a four-bar link mechanism 30 expands in the vertical direction and shrinks in the lateral direction, and the displacement extraction member 5*b* moves in the left-hand direction from the position in FIG. 8A to the position in FIG. 8B, by which the rod 15 goes into the case 12. Contrary, as shown in FIG. 8C, when a positive potential is applied to the conductive polymer stretch boards 2*a* to 2*b* and a negative potential is applied to the conductive polymer stretch boards 3*a* to 3*c*, the four-bar link mechanism 30 expands in the lateral direction and shrinks in the vertical direction and the displacement extraction member 5*b* moves in the right-hand direction from the position in FIG. 8A to the position in FIG. 8B, by which the rod 15 comes out of the case 12.

With such structure, it becomes possible to provide a easy-to-hold push-pull-type conductive polymer actuator, which also shares the same characteristics with the first embodiment, that is: having driving force in the expansion direction and rigidity in the contraction direction without application of preloads while keeping the displacement directions of the displacement extraction members 5*a* to 5*d* and the direction of the driving force from being affected by displacement dispersion generated by the conductive polymer stretch boards 2*a* to 2*b* and 3*a* to 3*d* or by structural errors.

Although the electrolyte holding layer is the electrolyte 14 in the fifth embodiment, the electrolyte holding layer may be gel electrolytes 4*a*, 4*b* as with the case of the former embodiment. These cases are all included in the present invention.

Figure 9:
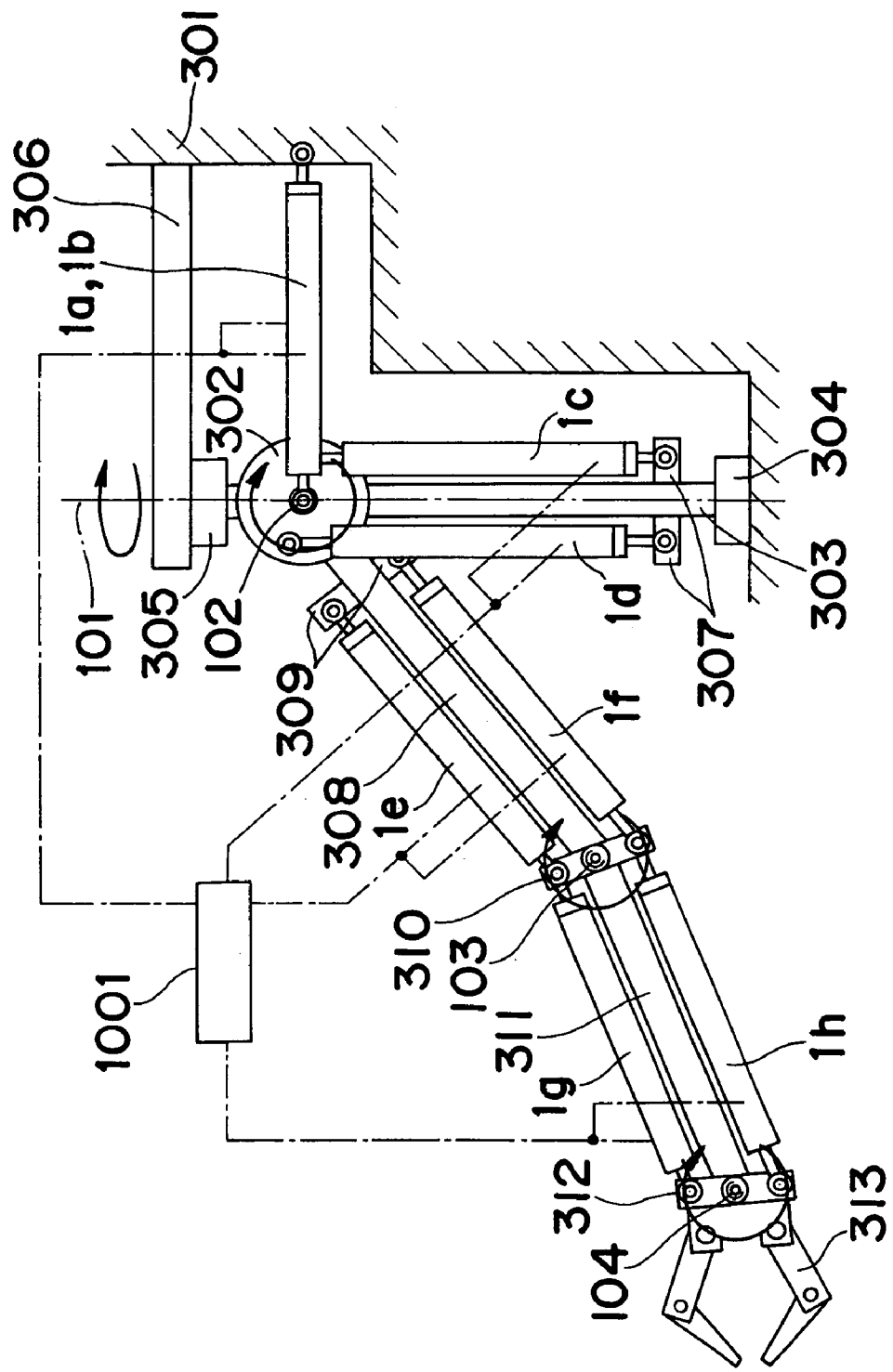
FIG. 9 is an outline view for showing a robot arm using the artificial muscle actuator according to the fifth embodiment of the present invention.

Moreover, FIG. 9 shows a configuration example of a robot arm using a plurality of the artificial muscle actuators 1E in the fifth embodiment. The artificial muscle actuators 1*a* to 1*h* are used in pairs as antagonistic muscle structures to form a pair of driving units in each robot arm. Out of a pair of driving units of each robot arm, one driving unit is made expand and the other driving unit is made shrink or vice versa, by which positive and negative rotational motions can be generated in shafts 101 to 104 to which a pair of the driving units of the robot arm are linked. More specifically, in the configuration in FIG. 9, the expansion and shrinkage operations of the artificial muscle actuators 1a, 1b lead to positive and negative rotations of the vertical shaft 101, and in a similar manner, the expansion and shrinkage operations of the artificial muscle actuators 1c, 1d, the expansion and shrinkage operations of the artificial muscle actuators 1e, 1f, and the expansion and shrinkage operations of the artificial muscle actuators 1g, 1h lead to positive and negative rotations of the shaft 102, the shaft 103, and the shaft 104, respectively.

More specifically, the 4-degree-of-freedom robot arm is composed of a vertical shaft 101 of a first joint for performing positive and negative rotations along a vertical direction shaft with respect to a fixed wall 301 in a plane along the transverse direction, a shaft 102 of a second joint for performing positive and negative rotations in a plane along the vertical direction, a shaft 103 of a third joint for performing positive and negative rotations bilaterally between a second arm 308 and a first arm 311, and a shaft 104 of a fourth joint for performing positive and negative rotations bilaterally between the first arm 311 and a hand 313.

In the first joint 101, circle supports 302, 302 are rotatably linked to both sides of an upper portion of a rotation shaft 303, whose upper and lower end portions are rotatably supported by bearings 304, 305 along the vertical direction, and each one end portion of the artificial muscle actuators 1a, 1b (the artificial muscle actuator 1b is not shown as disposed behind the artificial muscle actuator 1a) is linked to the fixed wall 301 while each other end portion is linked to the support shaft 102 (the shaft 102 of the second joint) of the respective circle supports 302. Therefore, by antagonistic driving of the artificial muscle actuators 1a, 1b, the first arm 311, the second arm 308, and the hand 313 of the robot arm may integrally perform positive and negative rotational motions around the vertical shaft 101 of the first joint in the plane along the traverse direction. It is to be noted that the upper-side bearing 305 is supported by the fixed wall 301 via a support bar 306.

In the second joint, one end of a second arm link 308 is fixed onto two circle supports 302, 302 fixed to both the sides of the rotation shaft 303. The artificial muscle actuators 1c, 1d are linked to between the circle supports 302, 302 of the second arm link 308 and supports 307, 307 fixed orthogonally to one end of the rotation shaft 303, and by antagonistic driving of the artificial muscle actuators 1c, 1d, the first arm 311, the second arm link 308, and the planar portion 313 of the robot arm integrally perform positive and negative rotations around a lateral shaft that is the support shaft 102 of the second joint in the plane along the vertical direction.

In the third joint, along the second arm link 308, the artificial muscle actuators 1e, 1f are linked to between a support 310 which is rotatably linked to the top end of the second arm link 308 in the state of intersecting with the second arm link 308 and is fixed onto the base end of the first arm 311, and supports 309, 309 fixed orthogonally to the base end of the second arm link 308. By antagonistic driving of the artificial muscle actuator 1e, 1f, the first arm 311 and the hand 313 integrally perform positive and negative rotations around a lateral shaft that is the support shaft 103 of the third joint in the plane along the vertical direction.

In the fourth joint, along the first arm 311, the artificial muscle actuators 1g, 1f are linked to between the support 310 which is fixed onto the base end of the first arm 311 in the state of intersecting with the first arm 311 between the top end of the second arm link 308 and the base end of the first arm 311, and a support 312 which intersects with the first arm 311 and is fixed onto the base end of the hand 313 between the top end of the first arm 311 and the base end of the hand 313. By antagonistic driving of the artificial muscle actuator 1g, 1h, the hand 313 performs positive and negative rotations around a lateral shaft that is the support shaft 103 of the third joint in the plane along the vertical direction.

The voltage of the power source 7 and the state of the switch 8 in each of the artificial muscle actuators 1a, 1b, the artificial muscle actuators 1c, 1d, the artificial muscle actuators 1e, 1f, and the artificial muscle actuators 1g, 1h are appropriately controlled by a control computer 1001, so that the shrinkage and expansion operations in each of the artificial muscle actuators 1a, 1b, the artificial muscle actuators 1c, 1d, the artificial muscle actuators 1e, 1f, and the artificial muscle actuators 1g, 1h are controlled.

With such structure, it becomes possible to provide a robot arm utilizing multiple degree of freedom and performing supple operation like human arms. By this, it becomes possible to realize a robot arm particularly appropriate for household use.

Figure 10A:
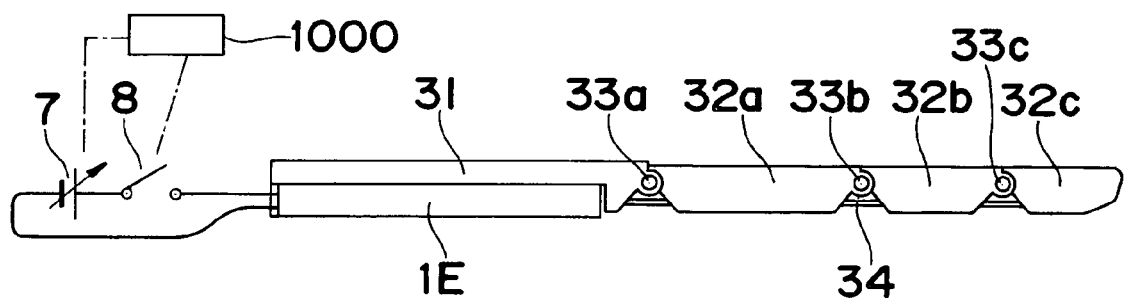
FIG. 10A is an outline view for showing a finger portion that is a part of a robot hand using the artificial muscle actuator according to the fifth embodiment of the present invention.
Figure 10B:
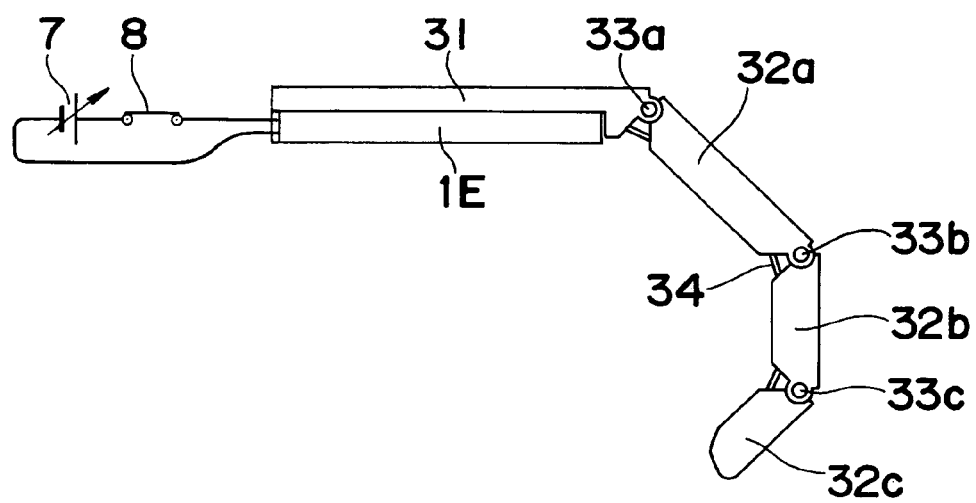
FIG. 10B is an outline view showing the finger portion that is a part of the robot hand using the artificial muscle actuator according to the fifth embodiment of the present invention.
Figure 11A:
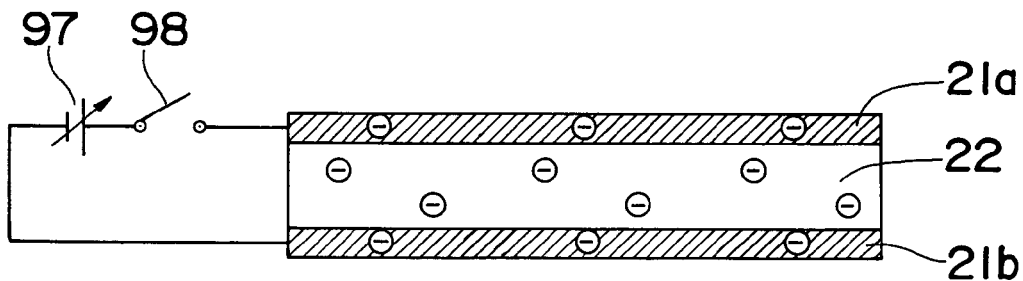
FIG. 11A is a view for showing the outline of a conventionally-structured artificial muscle actuator.
Figure 11B:
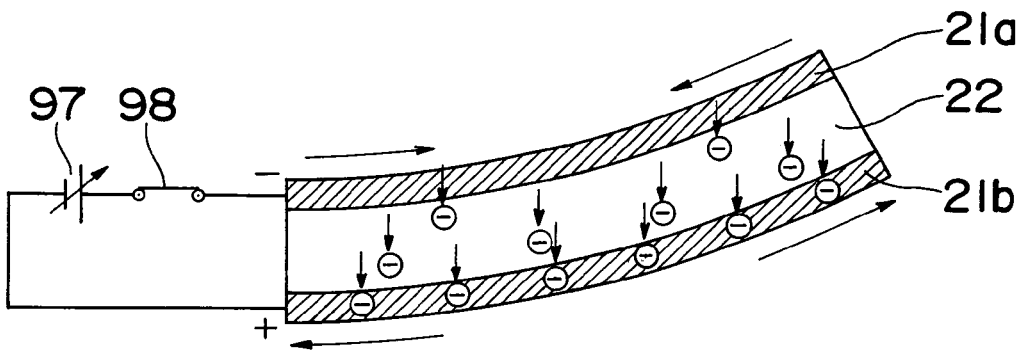
FIG. 11B is a view for showing the outline of the conventionally-structured artificial muscle actuator.
Figure 11C:
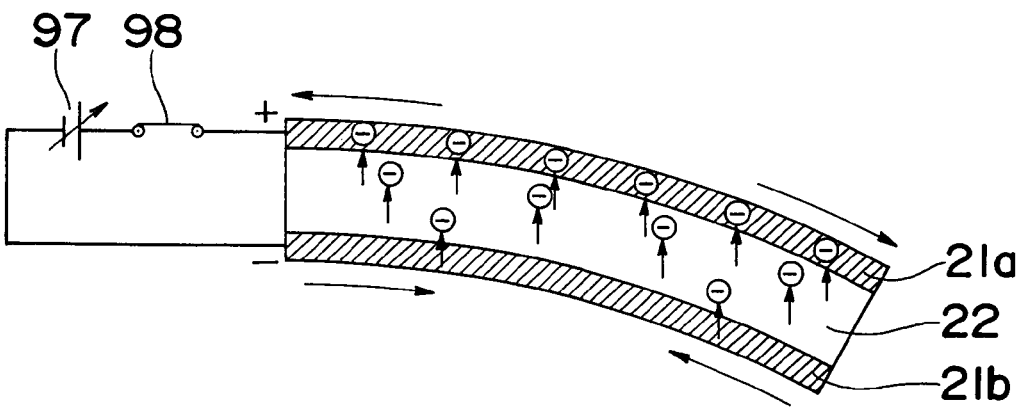
FIG. 11C is a view for showing the outline of the conventionally-structured artificial muscle actuator.

Moreover, FIG. 10A and FIG. 10B show a configuration example of a finger portion which is a part of a robot hand using at least one artificial muscle actuator 1E in the fifth embodiment. The artificial muscle actuator 1E is fixed to a back 31 of a robot hand, and moves a wire 34, which is connected to the rod 15 of the artificial muscle actuator 1E, backward and forward in compliance with the state of the power source 7 and the switch 8. The wire 34 extends through fingers 32a, 32b on the base end side and is joined to a finger 32c on the top end side. The back 31 and the finger 32a are joined together by a rotation shaft 33a in a rotatable state. Similarly, the finger 32a and the finger 32b are joined together by a rotation shaft 33b, and the finger 32b and the finger 32c are joined together by a rotation shaft 33c in a rotatable state. When the artificial muscle actuator 1E shrinks, the wire 34 is pulled toward the back 31 and so the finger portion of the robot hand is deformed in the state of being flexed as shown in FIG. 10B. When the artificial muscle actuator 1E expands, the wire 34 is pulled away from the back 31 and so the finger portion of the robot hand is deformed in the state of being stretched as shown in FIG. 10A.

The voltage of the power source 7 and the state of the switch 8 of the artificial muscle actuator 1E are appropriately controlled by a control computer 1000, so that the shrinkage and expansion operations of the artificial muscle actuator is controlled. With this, flexing operation of the finger portion of the robot hand is controlled. Moreover, by using the artificial muscle actuator 1E in each of a plurality of finger portions in the robot hand, grasping operation becomes controllable.

With such structure, it becomes possible to provide finger portions of a robot hand or robot hands which can perform supple operation like human fingers or hands. By this, it becomes possible to realize finger portions of a robot hand or robot hands particularly appropriate for household use.

It is to be noted that in the respective embodiments, the voltage applied to soft electrodes for generating appropriate deformations in the conductive polymer stretch boards 2a, 2a-1, 2a-2, 2b, 2c, 2d, 3a, 3b, 3c is preferably in the range which prevents electrolysis from occurring in the gel electrolytes 4a, 4b, 4c, 4d, 4e, 4f which are the electrolyte holding layers and the electrolyte 14.

By properly combining the arbitrary embodiments of the aforementioned various embodiments, the effects possessed by the embodiments can be produced.

The conductive polymer actuator according to the present invention, which makes it possible to provide actuators having driving force in the expansion direction and rigidity in the contraction direction without application of preloads, is usable as artificial muscle actuators or the like, and is suitable as a driving unit of robot arms or robot hands in a robot using the same.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A conductive polymer actuator, comprising:
   a first conductive polymer film and a second conductive polymer film connected via an electrolyte holding layer;
   a first displacement extraction member connected to the first conductive polymer film; and
   a second displacement extraction member connected to the second conductive polymer film, wherein
   the first displacement extraction member and the second displacement extraction member are arranged to have a different displacement direction, and the first and second displacement extraction members are connected in such a way that a swell-directional displacement of one member is reciprocally converted to a shrinkage-directional displacement of the other member to give a potential difference to between the first conductive polymer film and the second conductive polymer film, so that one of the first conductive polymer film and the second conductive polymer film swells while the other shrinks by an oxidation-reduction reaction.

2. The conductive polymer actuator as defined in claim 1, wherein the connection between the first and second displacement extraction members is a connection via a link mechanism.

3. The conductive polymer actuator as defined in claim 1, wherein the connection between the first and second displacement extraction members is a mutual connection at locations with an angle different from an angle of respective displacement directions.

4. The conductive polymer actuator as defined in claim 1, wherein the connection between the first and second displacement extraction members is a connection via an elastic member.

5. The conductive polymer actuator as defined in claim 2, wherein the first displacement extraction member holds respective end portions of the first conductive polymer film and is electrically connected thereto, while the second displacement extraction member holds respective end portions of the second conductive polymer film and is electrically connected thereto, and the link mechanism constitutes a parallel link mechanism with coupling members, in which the adjacent first displacement extraction member and second displacement extraction member are coupled together through the coupling members having an identical length.

6. The conductive polymer actuator as defined in claim 1, wherein the first conductive polymer film and the second conductive polymer film are arranged alternately in thickness direction.

7. The conductive polymer actuator as defined in claim 1, wherein the first conductive polymer film and the second conductive polymer film are arranged in parallel.

8. The conductive polymer actuator as defined in claim 7, wherein the first conductive polymer film and the second conductive polymer film are arranged at regular intervals.

9. The conductive polymer actuator as defined in claim 1, wherein the displacement directions of the first displacement extraction member and the second displacement extraction member are equal to longitudinal directions of the first conductive polymer film and the second conductive polymer film, respectively.

10. The conductive polymer actuator as defined in claim 1, wherein the displacement directions of the first displacement extraction member and the second displacement extraction member are orthogonal.

11. The conductive polymer actuator as defined in claim 1, wherein either one of or both the first displacement extraction member and the second displacement extraction member are connected to a guide mechanism which is movable only in displacement direction of the respective displacement extraction members.

12. A robot, comprising:
   a robot arm; and
   a pair of robot arm driving units structured to have an antagonist muscle structure composed of a pair of conductive polymer actuators as defined in claim 1.

* * * * *